United States Patent
DeRosa

(10) Patent No.: US 7,525,753 B1
(45) Date of Patent: Apr. 28, 2009

(54) REDUCING SEEK WIND-UP IN A DISK DRIVE USING EARLY ACCELERATION FEEDFORWARD SIGNAL

(75) Inventor: Jeffrey V. DeRosa, Shrewsbury, MA (US)

(73) Assignee: Maxtor Corporation, Longmont, CO (US)

(*) Notice: Subject to any disclaimer, the term of this patent is extended or adjusted under 35 U.S.C. 154(b) by 591 days.

(21) Appl. No.: 11/384,692

(22) Filed: Mar. 20, 2006

Related U.S. Application Data

(60) Provisional application No. 60/727,624, filed on Oct. 18, 2005.

(51) Int. Cl.
*G11B 5/596* (2006.01)
(52) U.S. Cl. .................................. 360/77.02
(58) Field of Classification Search ............. 360/77.02, 360/75, 77.03, 77.04, 31, 78.09; 369/44.29; 702/56
See application file for complete search history.

(56) References Cited

U.S. PATENT DOCUMENTS

| | | | | |
|---|---|---|---|---|
| 5,426,545 | A | * | 6/1995 | Sidman et al. ........... 360/78.09 |
| 5,521,772 | A | | 5/1996 | Lee et al. |
| 6,101,453 | A | * | 8/2000 | Suwa et al. ................... 702/56 |
| 6,414,813 | B2 | | 7/2002 | Cvancara |
| 6,721,122 | B2 | * | 4/2004 | Aikawa et al. ........... 360/77.02 |
| 6,937,423 | B1 | | 8/2005 | Ngo et al. |
| 6,952,318 | B1 | | 10/2005 | Ngo |
| 6,963,463 | B2 | | 11/2005 | Sri-Jayantha et al. |
| 7,035,034 | B2 | * | 4/2006 | Semba et al. ................. 360/75 |
| 7,206,264 | B1 | * | 4/2007 | Hermanns ................ 369/44.29 |
| 2007/0070540 | A1 | * | 3/2007 | Noguchi et al. ............... 360/75 |

OTHER PUBLICATIONS

Abramovitch et al., "Disk Drive Control: The Early Years," Agilent Laboratories, Stanford University, No date, 14 pages.
"Rotary Acceleration Feed Forward (RAFF), Rotational Vibration Cancellation Technology in WD Raptor™ Serial ATA Hard Drives," 2004, Western Digital, 3 pages.

* cited by examiner

*Primary Examiner*—Fred Tzeng
(74) *Attorney, Agent, or Firm*—Myers Bigel Sibley & Sajovec

(57) ABSTRACT

Methods of controlling a transducer that is adjacent to a rotatable data storage disk in a disk drive are disclosed, the disk drive having an actuator configured to position the transducer, a rotational acceleration sensor configured to generate a rotational acceleration signal, a position error sensor configured to generate a position error signal, and a controller configured to control the actuator to move the transducer to a target track during a seek operation. The methods include dynamically adjusting a gain factor in response to the position error signal and the acceleration signal during a settle period following the seek operation, multiplying the rotational acceleration signal by the gain factor to generate an adjusted rotational acceleration signal, and adding the adjusted acceleration signal to the position error signal to generate an adjusted position error signal, and moving the transducer in response to the adjusted position error signal.

21 Claims, 7 Drawing Sheets

REDUCING SEEK WIND-UP IN A DISK DRIVE USING EARLY ACCELERATION FEEDFORWARD SIGNAL

RELATED APPLICATION

This application claims the benefit of and priority to U.S. Provisional Patent Application No. 60/727,624 titled "EARLY ACCELERATION FEEDFORWARD WITH POSITION ERROR SIGNAL THRESHOLD", filed Oct. 18, 2005, the disclosure of which is hereby incorporated herein by reference as if set forth in its entirety.

FIELD OF THE INVENTION

The present invention generally relates to digital data storage devices and, more particularly, to methods, apparatus, and computer program products for reducing self-induced rotational vibration associated with seeking a transducer between tracks on a disk in a disk drive.

BACKGROUND

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a desired settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, the forces that can be exerted on the actuator to obtain minimum average seek times can cause vibration of the actuator and the disk drive. In particular, forces that can be exerted on the actuator can cause energy to be stored in the compliant mounting structure of the cabinet in which the disk drive is mounted. Such forces may be returned to the disk drive in the form of rotational vibration (also referred to herein as seek wind-up, which is a form of post-seek oscillation), which may cause the transducer to move away from a desired location on the disk.

Rotational vibration in a disk drive may also be caused by rotation and spinning of other hard disk drives mounted in the same mounting frame. Techniques have been developed to address such rotational vibration. In particular, acceleration feedforward techniques have been developed in which a signal detected at an accelerometer mounted on the disk drive is added to a position error signal in a servo control loop. However, such techniques have not been completely successful in addressing self-induced rotational vibration such as seek wind-up.

SUMMARY

A disk drive according to some embodiments of the invention includes a head disk assembly (HDA) including a data storage disk, a transducer configured to read data from the disk and/or to write data to the data storage disk, and an actuator configured to position the transducer relative to the data storage disk. A rotational acceleration sensor is positioned on the HDA and is configured to generate a rotational acceleration signal proportional to a rotational acceleration of the HDA about an axis defined relative to a data storage surface of the data storage disk. A position error sensor is configured to generate a position error signal indicative of a difference between a desired position of the transducer and an actual position of the transducer relative to a track of the data storage disk. The disk drive further includes a controller configured to control the actuator to move the transducer to a target track during a seek operation. The controller is configured to dynamically adjust a gain factor in response to the position error signal and the rotational acceleration signal during a settle period following the seek operation, to multiply the rotational acceleration signal by the gain factor to generate an adjusted rotational acceleration signal, and to combine the adjusted acceleration signal and the position error signal to generate an adjusted position error signal. The controller is further configured to move the transducer in response to the adjusted position error signal.

According to some further embodiments, the rotational acceleration sensor can be configured to generate the rotational acceleration signal proportional to a rotational acceleration of the HDA about an axis that is normal to the data storage surface of the data storage disk. The controller may be further configured to multiply the rotational acceleration signal by the gain factor to generate the adjusted rotational acceleration signal, and to add the adjusted rotational acceleration signal to the position error signal to generate the adjusted position error signal irrespective of a magnitude of the position error signal and/or a magnitude of the rotational acceleration signal.

The controller may be further configured to dynamically adjust the gain factor in response to the rotational acceleration signal exceeding a rotational acceleration signal threshold.

The controller may be further configured to dynamically adjust the gain factor in response to the position error signal exceeding a position error signal threshold.

The controller may be further configured to dynamically adjust the gain factor in response to the rotational acceleration signal exceeding a rotational acceleration signal threshold and the position error signal exceeds a position error signal threshold.

The disk drive may further include a filter configured to filter the rotational acceleration signal to attenuate high frequency noise in the rotational acceleration signal.

The rotational acceleration signal may include an acceleration feedforward signal.

Some embodiments of the invention provide methods of controlling a transducer that is adjacent to a rotatable data storage disk in a disk drive having an actuator for positioning the transducer relative to the disk, a rotational acceleration sensor configured to generate a rotational acceleration signal that is proportional to a rotational acceleration of the disk drive about an axis defined relative to a surface of the data storage disk, a position error sensor configured to generate a position error signal indicative of a difference between a desired position of the transducer and an actual position of the transducer relative to a track of the data storage disk, and a controller configured to control the actuator to move the transducer to a target track during a seek operation. The methods include dynamically adjusting a gain factor in response to the position error signal and the rotational acceleration signal during a settle period following the seek operation, multiplying the rotational acceleration signal by the gain factor to provide an adjusted rotational acceleration signal, and combining the adjusted rotational acceleration signal with the position error signal to provide an adjusted position error signal, and moving the transducer in response to the adjusted position error signal.

Multiplying the acceleration signal and combining the resulting acceleration signal with the position error signal to provide an adjusted position error signal may be performed irrespective of a magnitude of the position error signal and/or a magnitude of the rotational acceleration signal.

In some embodiments, dynamically adjusting the gain factor may be performed in response to the rotational acceleration signal exceeding a rotational acceleration signal threshold. In some embodiments, dynamically adjusting the gain factor may be performed in response to the position error signal exceeding a position error signal threshold.

In further embodiments, dynamically adjusting the gain factor may be performed in response to the rotational acceleration signal exceeding a rotational acceleration signal threshold and the position error signal exceeds a position error signal threshold.

The methods may further include filtering the rotational acceleration signal to attenuate high frequency noise in the rotational acceleration signal.

Methods according to further embodiments of the invention include moving the transducer to the target track, generating the position error signal, and generating the rotational acceleration signal. In response to the position error signal exceeding a position error signal threshold, a gain factor is dynamically adjusted irrespective of an amount of time by which the transducer has been at the target track. The rotational acceleration signal is multiplied by the gain factor to provide an adjusted rotational acceleration signal, and the adjusted rotational acceleration signal is added to the position error signal to provide an adjusted position error signal. The transducer is moved in response to the adjusted position error signal.

In some embodiments, dynamically adjusting the gain factor is performed only while the rotational acceleration signal exceeds a rotational acceleration signal threshold. In some embodiments, dynamically adjusting the gain factor is performed during a settle period following the seek operation.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. The present invention may be embodied in hardware and/or in software (including firmware, resident software, micro-code, etc.). Consequently, as used herein, the term "signal" may take the form of a continuous waveform and/or discrete value(s), such as digital value(s) in a memory. Furthermore, although some of the diagrams include arrows on communication/operational paths to show a primary direction of communication/operation, it is to be understood that communication/operational may occur in the opposite direction to the depicted arrows.

Figure 1:
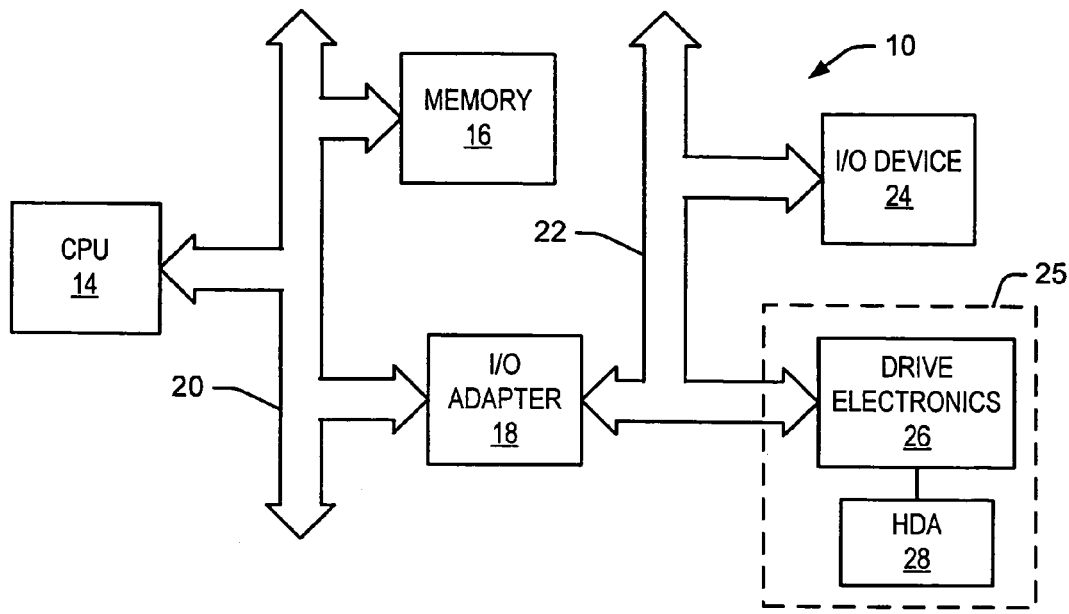
FIG. 1 is a block diagram of an exemplary computer system that includes a disk drive.

Referring to FIG. 1, an exemplary computer system 10 is shown that includes a central processing unit ("CPU") 14, a main memory 16, and an I/O (Input/Output) bus adapter 18, all interconnected by a system bus 20. Coupled to the I/O bus adapter 18 is an I/O bus 22, that may be, for example, a small computer system interconnect (SCSI) bus, firewire bus, and/or a universal serial bus. The I/O bus 22 supports various peripheral I/O devices 24 and a data storage unit such as a disk drive 25. The disk drive 25 includes drive electronics 26 and a head disk assembly 28 ("HDA").

Figure 2:
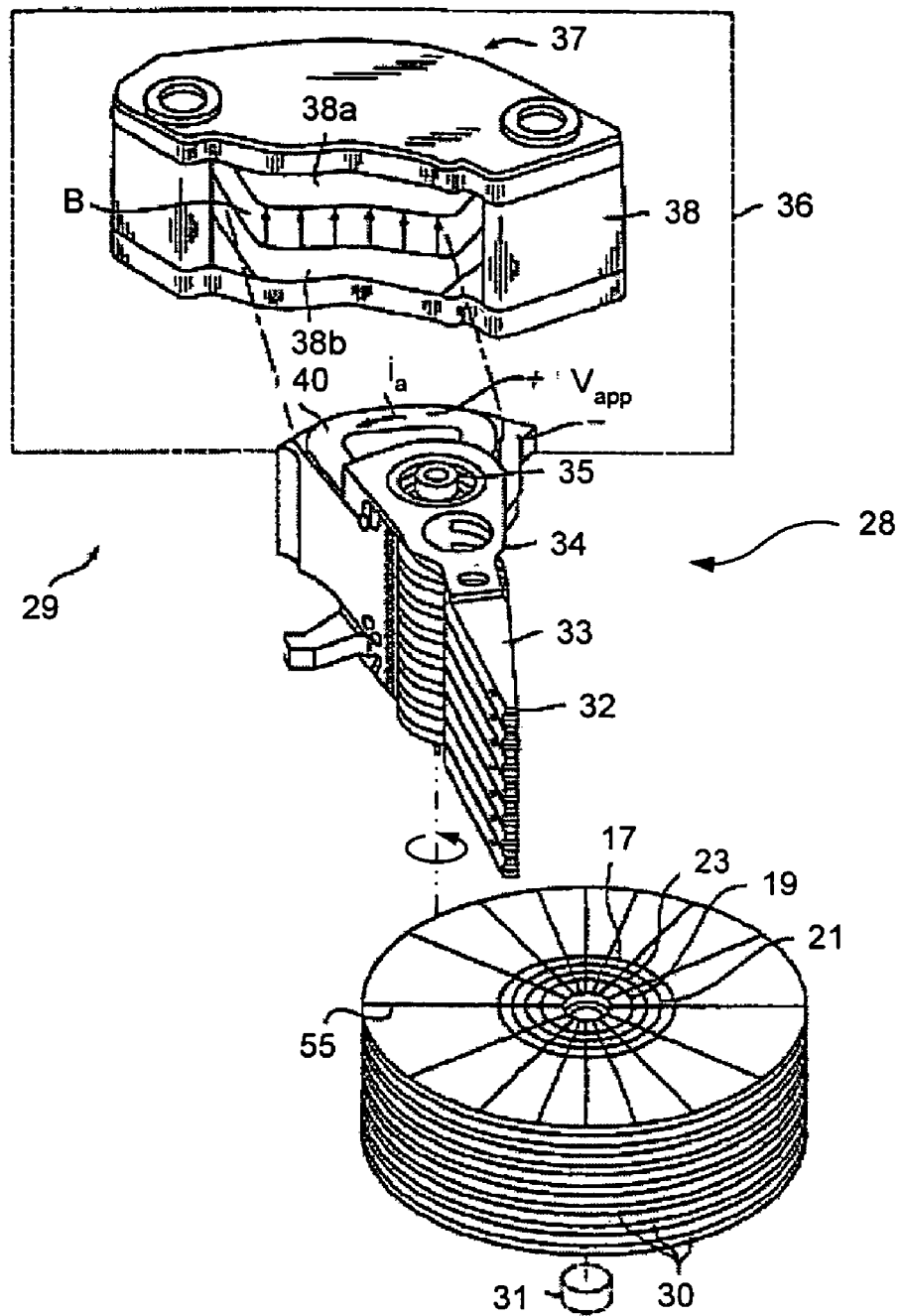
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30, for example, from an initial track 19 towards a target track 21 shown in FIG. 2. At the target track 21, the magnetic transducers 32 can read from and/or write data on the disks 30. A motor, such as a voice coil motor (VCM) 36 controls the radial movement of the actuator arms 34 in proportion to an input actuator current $i_a$. Although the disks 30 are described as magnetic disks for purposes of illustration, the disks 30 may alternatively be optical disks or any other type of storage disk which can have data storage tracks defined on one or more storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current $i_a$ is induced in the coil 40 disposed in the magnetic field B, a torque is produced on the actuator arms 34 resulting in radial motion of the arms 34 about pivot point 35. The polarity of the input actuator current $i_a$ determines the direction of radial motion of the actuator arms 34.

The radial motion of the actuator arms 34 may be transmitted into a compliant mounting structure of the cabinet in which the disk drive 25 is mounted. The energy may be stored in the cabinet and returned to the disk drive 25 as rotational vibration. As noted above, as the transducers 32 approach the target track 21, the servo system initiates a settle mode to bring the transducers 32 to rest over the target track 21 within a desired settle threshold. The time required for the transducers 32 to come to rest over the destination track may be referred to as the "settle time" or "settle period." Because energy may be stored in the cabinet during the seek operation, rotational vibration caused by such energy (i.e. seek wind-up) may be particularly problematic during the settle period.

Seek wind-up may vary in both magnitude and/or frequency from cabinet to cabinet, and even from slot to slot in the same cabinet. Excessive amounts of seek wind-up can lead to large performance variability in drives, which may lead to greatly reduced data transfer rates.

Figure 3:
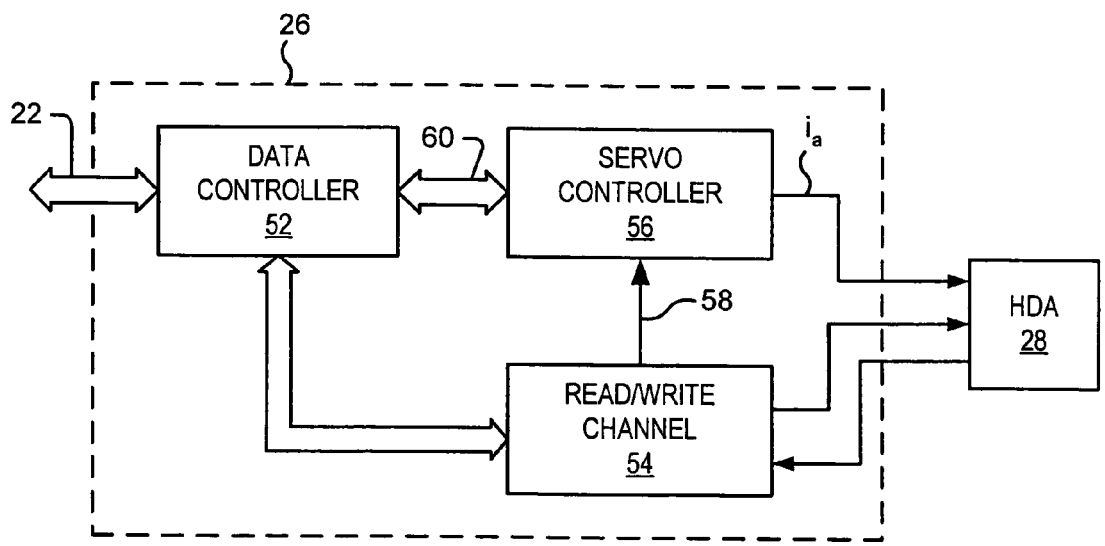
FIG. 3 is a block diagram of the drive electronics of the disk drive according to some embodiments of the present invention.

Referring to FIG. 3, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54. The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducers 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducers 32 in relation to that track and data block within the track. The transducer location information is induced into the transducers 32, converted from analog signals to digital data in the read/write channel 54, and transferred to the servo controller 56. The servo controller 56 can use the transducer location information for performing seek and tracking operations of the transducers 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command that is converted into the input actuator current $i_a$, and provided to the actuator 29 to radially move the transducers 32 across the disk 30. The seek time is thereby dependent on the magnitude of the current command. The energy imparted by the actuator arms 34 to the housing (which is later returned to the drive 25 as rotational vibration) is also dependent on the magnitude of the current command.

Figure 4:
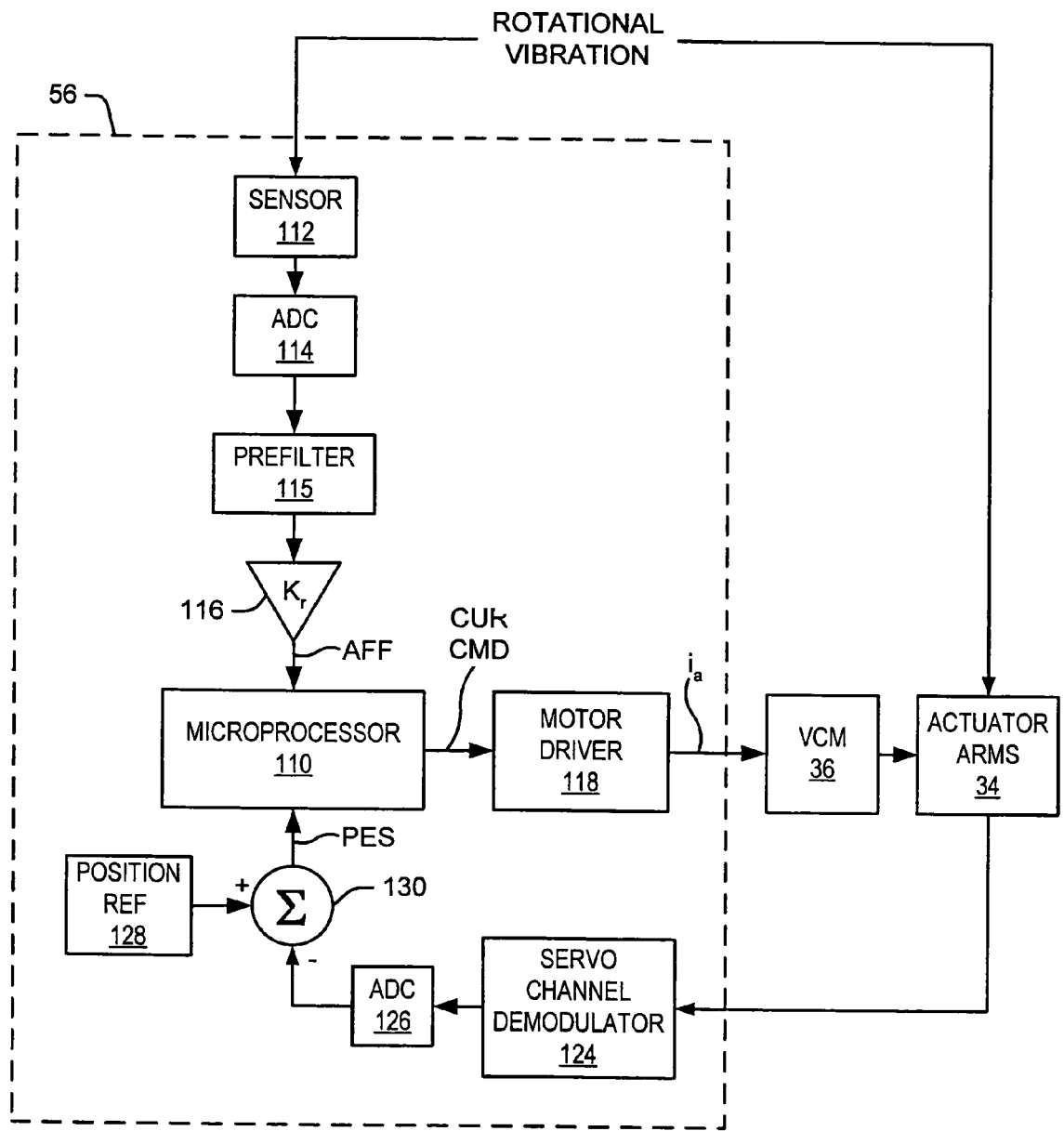
FIG. 4 is a block diagram of a servo controller according to some embodiments of the present invention.

FIG. 4 is a block diagram of a servo controller 56 illustrating acceleration feedforward systems and/or methods according to some embodiments of the invention. As shown therein, a servo controller 56 includes a controller 110 which is configured to generate a current command signal CUR CMD which is provided to a motor driver circuit 118. The motor driver circuit 118 converts the current command into an input actuator current signal $i_a$, which is provided to the voice coil motor VCM 36. As discussed above, the motor 36 moves the actuator arms 34 in response to the input actuator current signal $i_a$. A servo channel demodulator 124 generates a servo signal that is proportional to the position of the actuator arms 34. The servo signal is digitized by an analog to digital converter 126 and subtracted at a summing node 130 from a position reference signal generated by a position reference generator 128. Accordingly, the servo channel demodulator 124, the analog to digital converter 126, the position reference generator 128 and the summing node 130 form a position error sensor that is configured to generate a position error signal (PES) indicative of a difference between a desired position of the transducers 32 and an actual position of the transducers 32 relative to a track of the data storage disk 30. The position error signal is provided to the controller 110, which uses the PES to control the current command, to thereby adjust the position of the transducers 32 relative to the target track 21.

The servo controller 56 further includes a rotational vibration sensor 112, which generates a rotational vibration signal in response to rotational vibration energy applied to the disk drive 25. As shown in FIG. 4, the rotational vibration energy applied to the disk drive 25 is experienced by both the rotational vibration sensor 112 and by the actuator arms 34. The rotational vibration signal is sampled by an analog to digital converter 114 and filtered by a pre-filter 115 to attenuate unwanted high frequency sensor noise. The filtered signal is amplified by an amplifier 116 according to a gain factor Kr, which may be dynamically adjusted by the controller 110. The amplified rotational vibration signal is also used by the controller 110 to adjust the position of the transducers 32 relative to the target track 21.

While the prefilter 115 and amplifier 116 are shown as separate elements in FIG. 4, it will be appreciated that the filtering and/or amplification of the rotational vibration signal may be performed by a single element and/or by the controller 110. Furthermore, filtering and/or amplification of the rotational vibration signal may be performed before and/or after analog to digital conversion.

The rotational vibration sensor 112 may include a pair of linear accelerometers (not shown) arranged in a push-pull configuration. A signal output by one of the pair of accelerometers may be subtracted by a signal output by the other accelerometer to provide a rotational acceleration signal that is proportional to a rotational acceleration about an axis defined relative to a data storage surface of the disk 30. The sensor 112 may be configured so that the defined axis is normal to the data storage surface of the disk 30. The rotational vibration signal may be added by the controller 110 to the position error signal PES as an acceleration feedforward (AFF) signal to compensate in advance for rotational vibration experienced by the actuator arms 34.

According to some embodiments of the invention, the gain of the AFF signal (i.e., the gain of the amplifier 116 that amplifies the AFF signal) may be adjusted by the controller 110 in response to the AFF signal being correlated with the position error signal in order to obtain a gain that minimizes the position error signal. Accordingly, the gain of the AFF signal is adaptively updated by the controller 110 in order to reduce the position error signal. The sensor gain and the relationship between sensor output and the position error signal may vary greatly in real-world environments. In some cases, there may be no correlation between the sensor output and the position error signal. For example, the rotational vibration sensor 112 may sense acceleration during z-axis excitation, even though such excitation may not affect the position error signal. In that case, it may be preferable to reduce the sensor gain so as not to make the position error signal even worse. Thus, the sensor gain Kr may be increased when it appears to be correlated to the position error signal, and reduced when it is not correlated to the position error signal. In some embodiments, the AFF gain may be adjusted according to a least squares estimation algorithm.

In contrast to some embodiments of the invention, in conventional disk drive servo control systems, an acceleration feedforward signal is not used to adjust the position error signal during a settle period and/or the gain of the feedforward signal is not allowed to adapt until after the transducer has been on a track for a predetermined amount of time. However, according to some embodiments of the invention, the AFF signal is added to the position error signal during the settle period and/or the AFF signal gain is allowed to adapt immediately after the settle period has completed if the signal output and PES are above threshold limits. By adding the AFF signal to the position error signal during the settle period and/or allowing the AFF signal to adapt quickly after a seek, systems and/or methods according to embodiments of the invention may better account for rotational vibration caused by seek wind-up in a disk drive 25.

Figure 5:
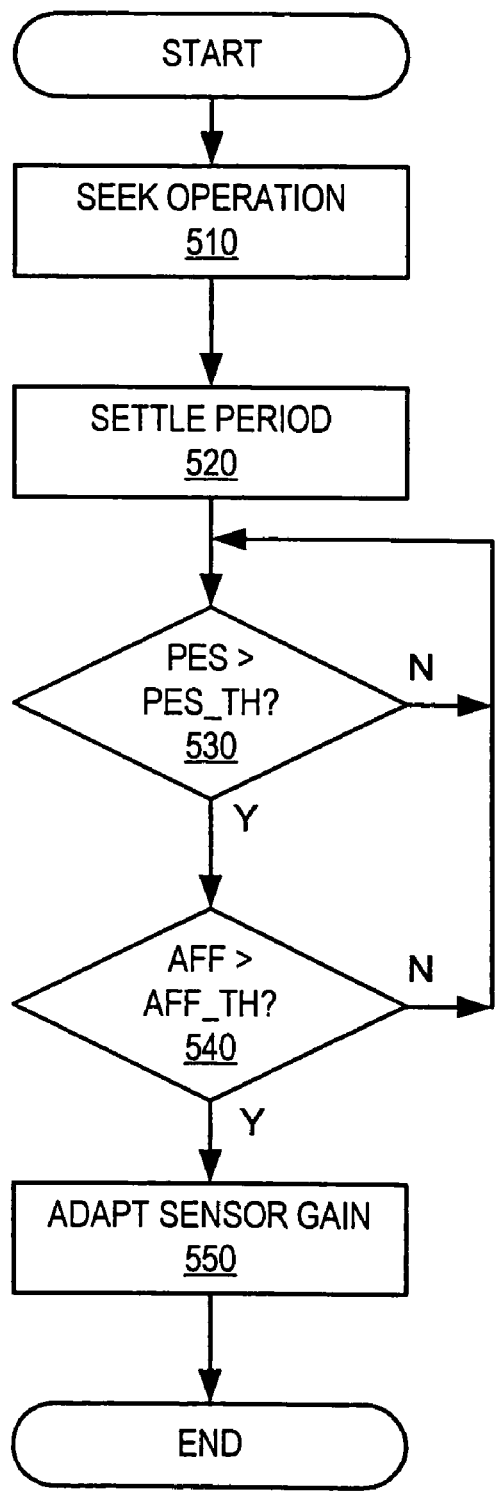
FIG. 5 is a flowchart showing operations associated with gain adaptation according to some embodiments of the invention.

Some embodiments of the invention are illustrated in the flowchart of FIG. 5. As shown therein, after a seek operation (block 510), the transducers 32 enter the settle mode during a settle period (block 520). Once the transducers 32 have entered the settle mode, a check is made to see if the position error signal PES is greater than a threshold value PES_TH (block 530). If so, a second check is made to see if the AFF signal value is greater than a threshold value AFF_TH (block 540). If both thresholds are met, the gain of the AFF signal is allowed to adapt in order to reduce the position error signal (block 550). By only adapting the signal gain when both the AFF signal and the PES are large, there is less likelihood that the gain adaptation will be made in response to sensor noise and/or other uncorrelated inputs. However, by permitting the AFF gain to adapt immediately after a seek when post-seek oscillation is largest, it may be possible to reduce the effect of seek wind-up. That is, by adapting the AFF gain according to some embodiments of the invention, the transient part of the PES signal that correlates to the AFF sensor output is accounted for.

In some conventional AFF algorithms, the AFF gain may not be adapted until after the transducer has been on track for a predetermined number of rotations. However, in real-world environments, a transducer rarely stays on the same track for more than one disk revolution. Methods according to some embodiments of the invention permit gain adaptation much sooner after a seek to better address seek-induced rotational vibration. Furthermore, it has been found that by permitting the gain to be adapted sooner after a seek, the AFF gain may stay nearer to an optimal level during seek operations. Moreover, it has been found that by adjusting the PES based on the AFF signal even before a threshold PES has been met, rotational vibration due to seek wind-up may be more effectively counteracted.

Figure 6:
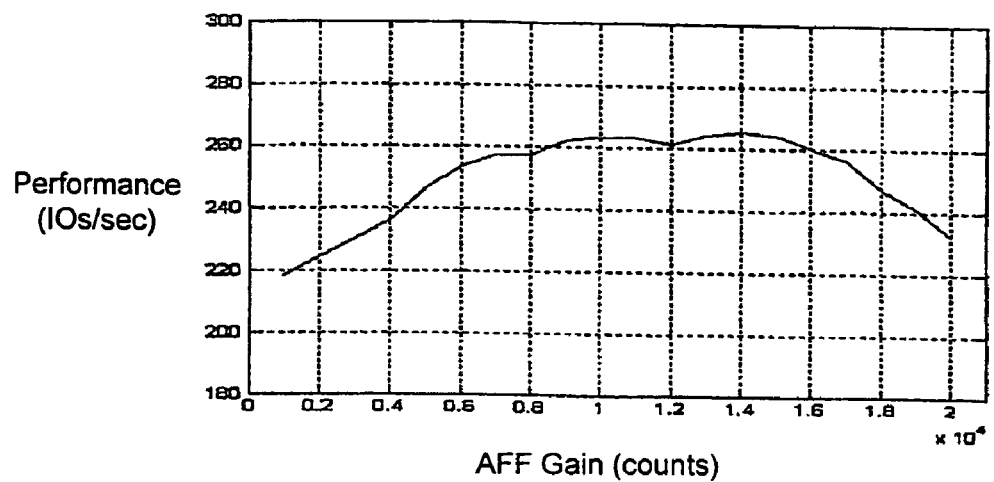
FIG. 6 is a graph of I/O performance versus an Acceleration Feedforward (AFF) gain for a disk drive.

FIG. 6 is a graph of I/O performance (in I/O operations per second) versus AFF gain for a disk drive. As shown in FIG. 6, I/O performance reaches a maximum near an AFF gain of about 13,000. When the AFF gain is set to zero (which may occur, for example when the PES and AFF signals are uncorrelated), the I/O performance is reduced.

Figure 7:
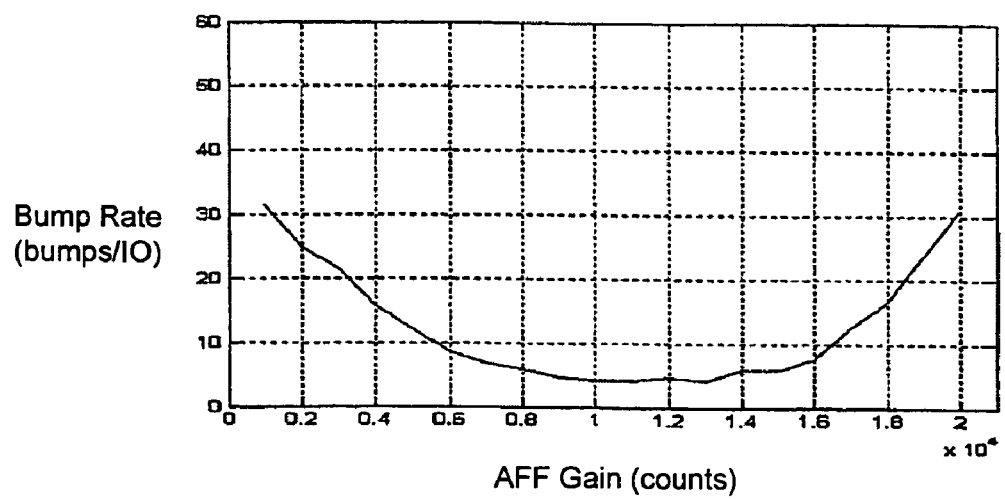
FIG. 7 is a graph of bump rate versus AFF gain for a disk drive.

FIG. 7 is a graph of bump rate versus AFF gain for a disk drive. As shown in FIG. 7, the bump rate (in bumps per I/O operation) is greatly reduced when the AFF gain is near a target value of about 13,000. Moreover, as the AFF gain approaches zero, the bump rate increases significantly. As used herein, "bumps" refers to a position error signal measurement that exceeds a predetermined limit (such as a 15% deviation from a desired track location). If the PES exceeds the predetermined limit, all write operations may be terminated until the PES drops below the limit for a predetermined number of disk revolutions or partial revolutions. Bumps may be detrimental to disk performance, as they may cause the HDA to spin extra revolutions to complete an I/O operation. As illustrated in FIG. 7, utilizing adaptive feedforward techniques can dramatically improve settling time provided the AFF gain is properly set.

Figure 8:
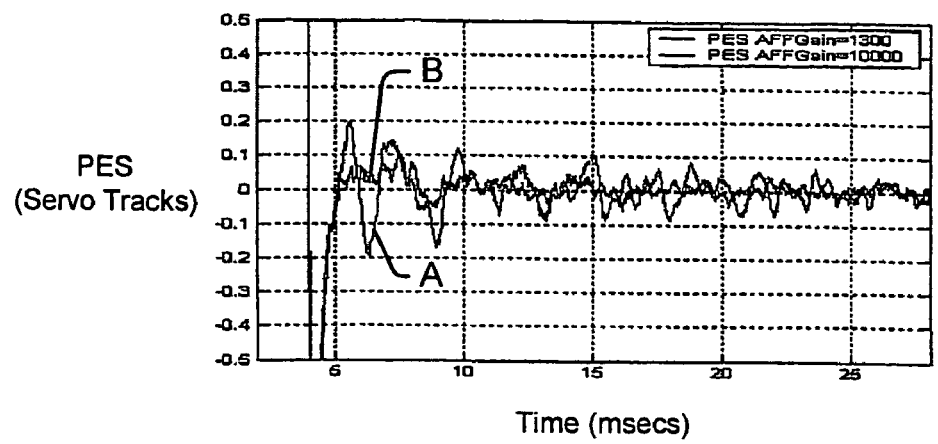
FIG. 8 is a graph of a position error signal (PES) versus time for various AFF gain settings for a disk drive.

To illustrate the reduction in bump rate, FIG. 8 is a graph of PES versus time for AFF gain settings of 1300 (Curve A) and 10,000 (Curve B) for a disk drive. As shown in FIG. 8, when the AFF gain is at 10,000, the PES signal settles more quickly with fewer adjustments than when the AFF gain is set at 1300.

Figure 9:
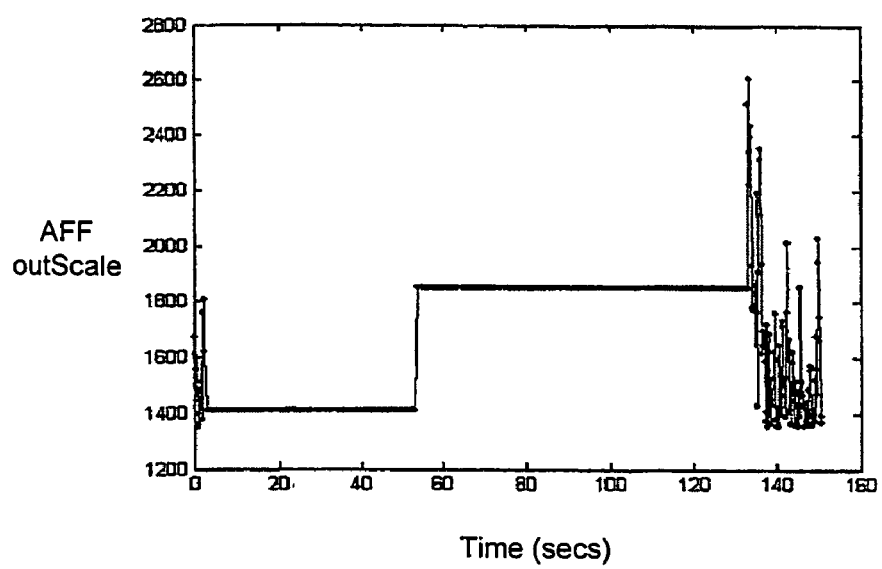
FIGS. 9 and 10 are graphs of AFF adaptive gain versus time for conventional gain adaptation algorithms.
Figure 10:
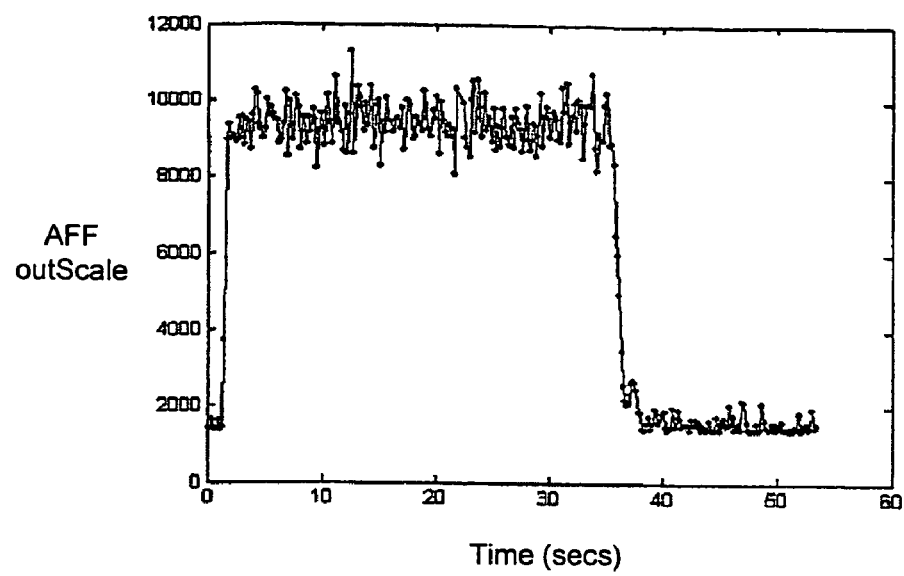

FIGS. 9 and 10 are graphs of AFF gain versus time for some conventional gain adaptation algorithms. In particular, FIG. 9 illustrates AFF gain for a subject disk drive mounted in a cabinet with four other disk drives. The subject disk drive performed I/O operations during the time interval from 5 to 130 seconds, while the other drives remained idle. As shown in FIG. 9, the AFF gain of the subject disk drive adapted only once, and stayed near a minimum value of 1300. FIG. 10 illustrates AFF gain for a subject disk drive mounted in a cabinet with three other disk drives. All three drives performed I/O during the period from 5 to 35 seconds, at which time the other drives stopped doing I/O. As shown in FIG. 10, the AFF gain stayed near a high value of 10,000 while the other drives were doing I/O, but dropped to a low value afterwards. Such behavior may result in large performance variability for a disk drive.

Figure 11:
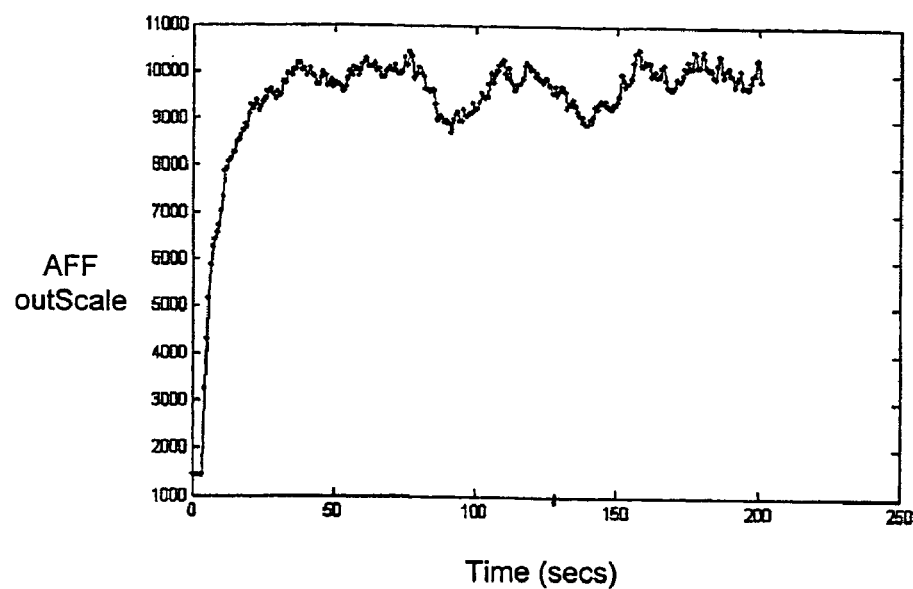
FIG. 11 is a graph of AFF adaptive gain versus time for a gain adaptation algorithm according to some embodiments of the invention.

FIG. 11 is a graph of AFF adaptive gain versus time for a gain adaptation algorithm according to some embodiments of the invention. FIG. 11 illustrates AFF gain for a subject disk drive mounted in a cabinet with four other drives. All three drives performed I/O during the period from 5 to 35 seconds, at which time the other drives stopped doing I/O. As shown in FIG. 11, the AFF gain of the subject drive adapted quickly and reached a target value of 10,000 soon after the I/O operations began. Even after the other drives stopped doing I/O operations, the AFF gain stayed near 10,000. Such behavior may result in relatively consistent I/O performance for a disk drive configured according to some embodiments of the invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
   a head disk assembly (HDA) including a data storage disk, a transducer configured to read data from the disk and/or to write data to the data storage disk, and an actuator configured to position the transducer relative to the data storage disk;
   a rotational acceleration sensor positioned on the HDA and configured to generate a rotational acceleration signal proportional to a rotational acceleration of the HDA about an axis defined relative to a data storage surface of the data storage disk;
   a position error sensor configured to generate a position error signal indicative of a difference between a desired position of the transducer and an actual position of the transducer relative to a track of the data storage disk;
   a controller that is configured to control the actuator to move the transducer to a target track during a seek operation, configured to dynamically adjust a gain factor in response to the position error signal and the rotational acceleration signal during a settle period following the seek operation, configured to multiply the rotational acceleration signal by the gain factor to generate an adjusted rotational acceleration signal and to combine the adjusted rotational acceleration signal with the position error signal to generate an adjusted position error signal, and configured to move the transducer in response to the adjusted position error signal.

2. The disk drive of claim 1, wherein the controller is further configured to multiply the acceleration signal by the gain factor and to combine the resulting acceleration signal with the position error signal to generate an adjusted position error signal irrespective of a magnitude of the position error signal.

3. The disk drive of claim 1, wherein the controller is further configured to multiply the acceleration signal by the gain factor and to combine the resulting acceleration signal with the position error signal to generate an adjusted position error signal irrespective of a magnitude of the rotational acceleration signal.

4. The disk drive of claim 1, wherein the controller is further configured to dynamically adjust the gain factor in response to the rotational acceleration signal exceeding a rotational acceleration signal threshold.

5. The disk drive of claim 1, wherein the controller is further configured to dynamically adjust the gain factor in response to the position error signal exceeding a position error signal threshold.

6. The disk drive of claim 1, wherein the controller is further configured to dynamically adjust the gain factor is performed in response to the rotational acceleration signal exceeding a rotational acceleration signal threshold and the position error signal exceeds a position error signal threshold.

7. The disk drive of claim 1, further comprising:
   a filter configured to filter the rotational acceleration signal to attenuate high frequency noise in the rotational acceleration signal.

8. The disk drive of claim 1, wherein the rotational acceleration signal comprises an acceleration feedforward signal.

9. The disk drive of claim 1, wherein the axis is normal to the data storage surface of the data storage disk.

10. A method of controlling a transducer that is adjacent to a rotatable data storage disk in a disk drive, the disk drive having an actuator configured to position the transducer relative to the disk, a rotational acceleration sensor configured to generate a rotational acceleration signal that is proportional to a rotational acceleration of the disk drive about an axis defined relative to a surface of the data storage disk and a position error sensor configured to generate a position error signal indicative of a difference between a desired position of the transducer and an actual position of the transducer relative to a track of the data storage disk, and a controller configured to control the actuator to move the transducer to a target track during a seek operation, the method comprising:
   dynamically adjusting a gain factor in response to the position error signal and the acceleration signal during a settle period following the seek operation;
   multiplying the rotational acceleration signal by the gain factor to generate an adjusted rotational acceleration signal and combining the adjusted rotational acceleration signal with the position error signal to generate an adjusted position error signal; and
   moving the transducer in response to the adjusted position error signal.

11. The method of claim 10, wherein multiplying the acceleration signal and combining the resulting acceleration signal with the position error signal to generate an adjusted position error signal is performed irrespective of a magnitude of the position error signal.

12. The method of claim 10, wherein multiplying the acceleration signal and adding the resulting acceleration signal to the position error signal to generate an adjusted position error signal is performed irrespective of a magnitude of the rotational acceleration signal.

13. The method of claim 10, wherein dynamically adjusting the gain factor is performed in response to the rotational acceleration signal exceeding a rotational acceleration signal threshold.

14. The method of claim 10, wherein dynamically adjusting the gain factor is performed in response to the position error signal exceeding a position error signal threshold.

15. The method of claim 10, wherein dynamically adjusting the gain factor is performed in response to the rotational acceleration signal exceeding a rotational acceleration signal threshold and the position error signal exceeds a position error signal threshold.

16. The method of claim 10, further comprising:
filtering the rotational acceleration signal to attenuate high frequency noise in the rotational acceleration signal.

17. The method of claim 10, wherein the rotational acceleration signal comprises an acceleration feedforward signal.

18. The method of claim 10, wherein the axis is normal to the data storage surface of the data storage disk.

19. A method of controlling a transducer that is adjacent to a rotatable data storage disk in a disk drive, the disk drive having an actuator configured to position the transducer relative to the disk, a rotational acceleration sensor configured to generate a rotational acceleration signal that is proportional to a rotational acceleration of the disk drive about an axis defined relative to a surface of the data storage disk and a position error sensor configured to generate a position error signal indicative of a difference between a desired position of the transducer and an actual position of the transducer relative to a track of the data storage disk, and a controller configured to control the actuator to move the transducer to a target track during a seek operation, the method comprising:
moving the transducer to the target track;
generating the position error signal;
generating the rotational acceleration signal;
responsive to the position error signal exceeding a position error signal threshold, dynamically adjusting a gain factor, irrespective of an amount of time by which the transducer has been at the target track;
multiplying the rotational acceleration signal by the gain factor and adding the resulting acceleration signal to the position error signal to generate an adjusted position error signal; and
moving the transducer in response to the adjusted position error signal.

20. The method of claim 19, wherein dynamically adjusting the gain factor is performed only while the rotational acceleration signal exceeds a rotational acceleration signal threshold.

21. The method of claim 19, wherein dynamically adjusting the gain factor is performed during a settle period following the seek operation.

* * * * *